Sept. 16, 1924.  
W. GOTTHEIMER  
RECEPTACLE OR CONTAINER  
Filed July 16, 1923

1,508,548

INVENTOR  
Walter Gottheimer.  
BY Ralph Kalish  
ATTORNEY

Patented Sept. 16, 1924.

1,508,548

UNITED STATES PATENT OFFICE.

WALTER GOTTHEIMER, OF ST. LOUIS, MISSOURI.

RECEPTACLE OR CONTAINER.

Application filed July 16, 1923. Serial No. 651,816.

*To all whom it may concern:*

Be it known that I, WALTER GOTTHEIMER, a citizen of the United States, residing at the city of St. Louis, State of Missouri, have invented a certain new and useful Improvement in Receptacles or Containers, of which the following is a specification, reference being had to the accompanying drawing, forming a part thereof.

This invention relates to a certain new and useful improvement in shipping or packing receptacles, containers, and the like.

The chief object of my present invention is the provision of a receptacle or container having an adjustable lid or cover, whereby the contents of the receptacle or container, though varying in quantity, may be compactly and firmly held within the receptacle.

Another object of my present invention is the provision of a receptacle or container of the type stated in which a member of the lid or cover locking means is adapted to also form or provide a carrying handle for the receptacle.

With the above and other objects in view, my present invention resides in the novel features of form, construction, arrangement, and combination of parts hereinafter described and afterwards pointed out in the claims.

Figure 1:
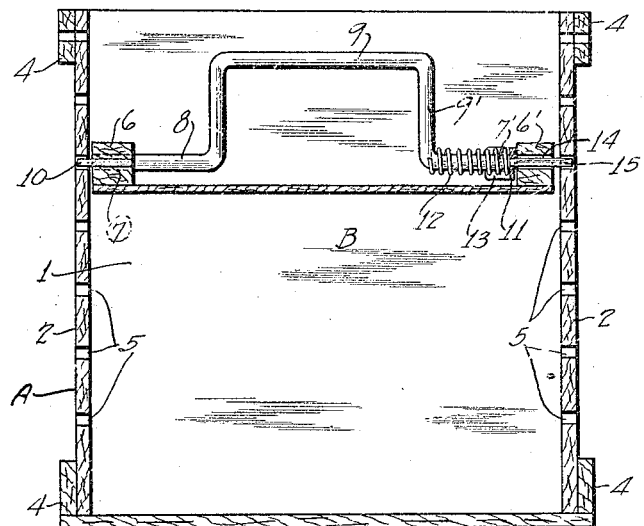
Figure 2:
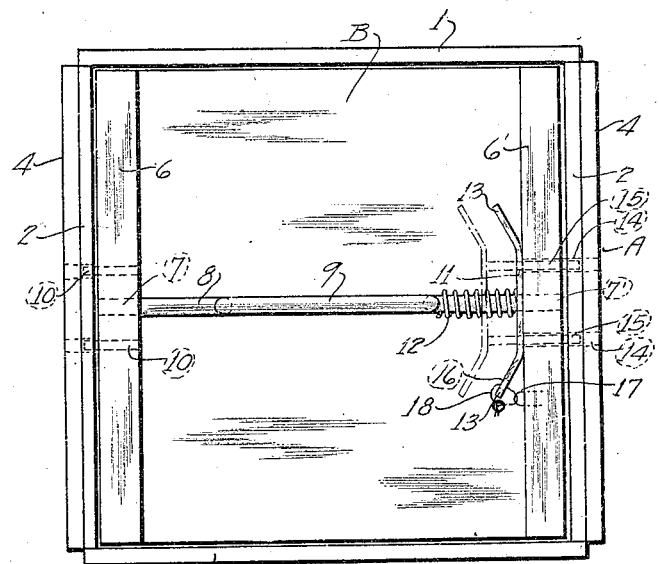

In the accompanying drawing,

Figure 1 is a vertical sectional view of a receptacle or container embodying my invention; and Figure 2 is a plan view of the receptacle or container.

Referring now more in detail and by reference characters to the drawing, which illustrates a preferred embodiment of my invention, the container or receptacle proper A is in the form of an open top shell preferably rectangular in shape, container A comprising end-walls 1—1, side walls 2—2, and a bottom wall 3 suitably fixed rigidly together. At their upper and lower margins, side walls 2—2 are preferably strengthened or re-enforced by cleats 4, as shown; and centrally substantially throughout their height, the opposite side walls 2—2 of shell A are formed with aligning pairs of suitably spaced openings or apertures 5.

Having relative dimensions to fit for free flatwise movement within shell A, is a lid or cover B provided upon its upper surface and at its opposite side margins with cleats 6—6'. Disposed over and above lid or cover B and rigidly seated at its opposite ends, as at 7—7', centrally of the lid B in the opposite cleats 6—6', is a bar 8 bent, as shown, intermediate its ends, as at 9, to provide a convenient hand-grip.

Seated in the cleat 6 upon opposite sides of the end 7 of bar 8, is a pair of rigid parallel pins 10—10, both of which project at an end beyond the outer face of the cleat 6 to fit selectively in one or the other of the pairs of openings 5 in the adjacent side wall 2 of the shell A.

Disposed for movement upon the opposite end-portion 7' of bar 8 between the cleat 6' and the adjacent side-bar 9' of handle 9, is a plate 11, and coiled on the bar end-portion 7' intermediate plate 11 and the side-bar 9' of handle 9, is a spring 12 adapted to yieldingly hold or maintain plate 11 flatwise against the inner side face of cleat 6', plate 11 being preferably obliquely offset at its opposite ends, as at 13—13, to provide a convenient finger-grip for movement of plate 11 inwardly upon bar end-portion 7' against the tension of spring 12.

Projecting outwardly from plate 11 upon opposite sides of bar end-portion 7' and freely movable in ways or openings 14—14 provided in the cleat 6' for the purpose, is a second pair of parallel pins 15—15 of a length when plate 11 is in flatwise impinging position upon cleat 6' to project beyond the outer side face of cleat 6' to removably fit likewise selectively in one or the other pair of openings 5 in the opposite side wall of shell A.

In use or operation, it will be now obvious that depending upon and as the quantity of the contents of shell A varies, lid B is first disposed somewhat obliquely within shell A with its movable pair of pins 15 held by plate 11 in retracted position. Lid B is then moved within shell A to locate and project its fixed pair of pins 10 into the pair of side wall apertures or openings 5 first appearing above the level of the contents of the shell. The lid B is then manipulated to a horizontal position within the shell to locate its pair of movable pins 15 for projection into the aligning pair of apertures or openings 5 in the opposite side wall 2, when, pull upon plate 11 being removed, the pins 15 freely move into such apertures 5, the lid B being thereby firmly held in such position within shell A directly above its contents and the contents of the shell being thus firmly and compactly held within the shell. And with lid B so locked to and within shell A, the portion 9 of bar 8 provides a ready and convenient carrying handle for the shell A and its contents. To remove lid B to permit access to the contents of shell A, merely a reversal of the operations here stated is required.

I am aware that minor changes in the form, construction, arrangement, and combination of the several parts of my new receptacle or container may be made and substituted for those herein shown and described without departing from the nature and principle of my invention.

As best seen in Figure 2, the plate 11 is provided with an opening, as at 16, and fixed in cleat 6' adjacent the opening 16, is a staple 17. Adapted for engagement with the staple 17 and with the plate 11 at this opening 16, is a wire or other suitable means 18 for sealing the lid B in adjusted position within the container A.

Having thus described my invention, what I claim and desire to secure by Letters Patent is:

1. A receptacle comprising a contents-containing shell provided vertically upon its walls with series of spaced aligning openings, in combination with a lid adapted to flatwise adjustably fit within the shell, and means for locking the lid in selected adjusted position to and within the shell, said means including a fixed pin upon the lid adapted to fit selectively within the openings of one of said series, and a yielding pin upon the lid adapted to fit selectively within the aligning openings of the other series.

2. A receptacle comprising a contents-containing shell provided vertically upon its walls with series of spaced pairs of aligning openings, in combination with a lid adapted to flatwise adjustably fit within the shell, and means for locking the lid in selected adjusted position to and within the shell, said means including a pair of fixed pins upon the lid adapted to fit selectively in the pairs of openings of said series, a bar fixed upon the lid, a plate yieldingly movable upon said bar, and a pair of pins carried by the plate and adapted to fit selectively within the aligning pairs of openings of the other series.

3. A receptacle comprising an open-top contents-containing shell, in combination with a lid adapted to flatwise adjustably fit within the shell, and means including a bar fixed upon the lid for locking the lid in selected adjusted position to and within the shell, said bar also providing a carrying handle for the shell when the lid is locked to the shell.

In testimony whereof, I have signed my name to this specification.

WALTER GOTTHEIMER.